United States Patent
Yoshino et al.

(10) Patent No.: US 9,923,607 B2
(45) Date of Patent: Mar. 20, 2018

(54) INPUT/OUTPUT APPARATUS HAVING AN IDENTIFICATION TERMINAL

(75) Inventors: Yoshitaka Yoshino, Tokyo (JP); Satoru Tsuboi, Kanagawa (JP); Tadashi Imai, Chiba (JP); Akira Ishizuka, Tochigi (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 14/007,019

(22) PCT Filed: Mar. 21, 2012

(86) PCT No.: PCT/JP2012/057115
§ 371 (c)(1),
(2), (4) Date: Sep. 24, 2013

(87) PCT Pub. No.: WO2012/133023
PCT Pub. Date: Oct. 4, 2012

(65) Prior Publication Data
US 2014/0009879 A1    Jan. 9, 2014

(30) Foreign Application Priority Data

Mar. 30, 2011 (JP) ................ 2011-075325
Aug. 3, 2011 (JP) ................ 2011-170372
Feb. 23, 2012 (JP) ................ 2012-036951

(51) Int. Cl.
*H01Q 1/22* (2006.01)
*H04B 7/00* (2006.01)
(Continued)

(52) U.S. Cl.
CPC ............ *H04B 7/00* (2013.01); *H01Q 1/2275* (2013.01); *H01Q 1/273* (2013.01); *H01Q 9/16* (2013.01); *H04M 1/72527* (2013.01)

(58) Field of Classification Search
CPC .......... H01Q 1/2275; H01Q 1/44; H01Q 1/50; H01Q 21/28; H01Q 9/42
USPC ................ 343/791, 830, 872, 873, 904–906; 439/166, 170–175; 710/62–74; 348/75, 348/729; 455/557–559
See application file for complete search history.

(56) References Cited

U.S. PATENT DOCUMENTS

2007/0052582 A1 * 3/2007 Houlberg et al. ........ 342/357.06
2007/0230539 A1 * 10/2007 Moshavi ..................... 375/130
(Continued)

FOREIGN PATENT DOCUMENTS

CN        1832631        9/2006
CN      101917497       12/2010
(Continued)

OTHER PUBLICATIONS

User Guide, "HP USB Digital/Analog TV Tuner", Aug. 2008, Document Part No. 490716-001.*
(Continued)

*Primary Examiner* — Allahyar Kasraian
(74) *Attorney, Agent, or Firm* — K&L Gates LLP

(57) ABSTRACT

There is provided an input/output apparatus. Among information terminals of an input/output connector provided in an information terminal device, at least one information terminal of information terminals to switch an internal operation of the information terminal device is used also as an antenna input terminal.

18 Claims, 12 Drawing Sheets

(51) Int. Cl.
*H01Q 1/27* (2006.01)
*H01Q 9/16* (2006.01)
*H04M 1/725* (2006.01)

(56) References Cited

U.S. PATENT DOCUMENTS

| | | | |
|---|---|---|---|
| 2008/0290967 A1* | 11/2008 | Tong | H05K 1/0228 333/175 |
| 2009/0033574 A1 | 2/2009 | Hung | |
| 2009/0111533 A1* | 4/2009 | Johansson et al. | 455/575.1 |
| 2009/0153408 A1* | 6/2009 | Kazanchian | 343/702 |
| 2010/0125438 A1* | 5/2010 | Audet | 702/189 |
| 2010/0141847 A1* | 6/2010 | Jayaram et al. | 348/726 |
| 2010/0161842 A1* | 6/2010 | Shan et al. | 710/18 |
| 2010/0169534 A1* | 7/2010 | Saarinen | G06F 13/385 710/316 |
| 2010/0306443 A1* | 12/2010 | Lin et al. | 710/313 |
| 2012/0112984 A1* | 5/2012 | Wang | 343/906 |
| 2012/0183262 A1* | 7/2012 | Schwandt | G02B 6/3817 385/88 |
| 2012/0189068 A1* | 7/2012 | Korner | H01Q 1/44 375/259 |
| 2012/0207141 A1* | 8/2012 | Norair | 370/338 |
| 2013/0089125 A1* | 4/2013 | Kim | 375/222 |
| 2013/0101132 A1 | 4/2013 | Gu et al. | |
| 2013/0135154 A1* | 5/2013 | Sumi | 343/700 MS |
| 2014/0120902 A1* | 5/2014 | Hahn et al. | 455/422.1 |
| 2014/0184469 A1* | 7/2014 | Yoshino et al. | 343/906 |
| 2015/0055020 A1* | 2/2015 | Yoshino et al. | 348/706 |

FOREIGN PATENT DOCUMENTS

| | | |
|---|---|---|
| EP | 1976074 | 10/2008 |
| JP | 2005-159437 A | 6/2005 |
| JP | 2008-278398 | 11/2008 |
| JP | 2008-311825 | 12/2008 |
| JP | 2010-157991 | 7/2010 |
| JP | 2010-219904 | 9/2010 |

OTHER PUBLICATIONS

European Search Report dated Aug. 11, 2014, for corresponding European Appln. No. 12763425.1.
Notification of the First Office Action issued in connection with Chinese Patent Application No. 2012800146248, dated Aug. 28, 2014. (18 pages).
Japanese Office Action dated Jun. 24, 2016 in corresponding Japanese application No. 2015-164002 (6 pages).
Korean Office Action dated Apr. 10, 2017 in corresponding Korean Application No. 10-2013-7024445.

* cited by examiner

FIG. 9
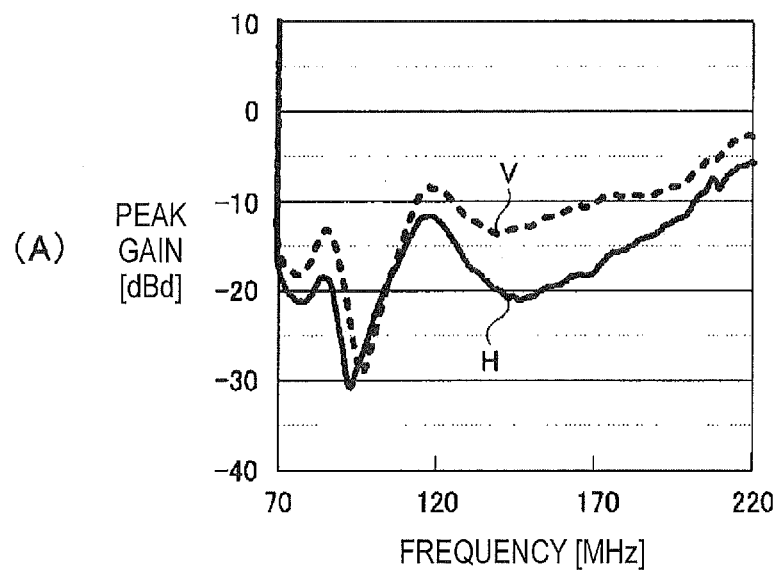
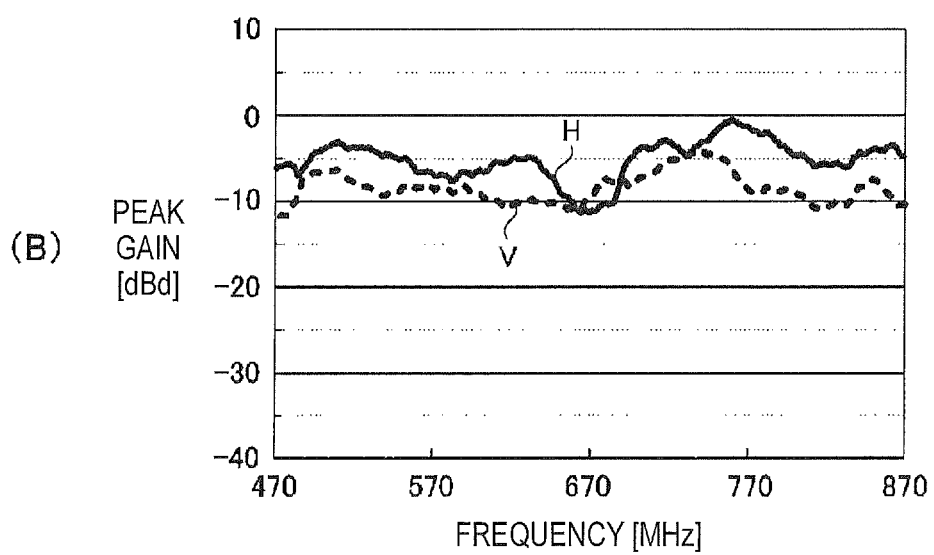

FIG. 12

COMPARISON OF TERMINAL FUNCTION OF Micro USB AND MHL

| SIGNAL TERMINAL | TERMINAL FUNCTION | |
| --- | --- | --- |
| | Micro USB | MHL |
| No.1 | POWER SUPPLY (VBUS) | POWER SUPPLY (VBUS OF USB) |
| No.2 | DIFFERENTIAL PAIR (D-) | DIFFERENTIAL PAIR (-) |
| No.3 | DIFFERENTIAL PAIR (D+) | DIFFERENTIAL PAIR (+) AND CLOCK SIGNAL |
| No.4 | ID IDENTIFICATION OF "USB OTG" | CONTROL SIGNAL (CBUS) |
| No.5 | GROUND | GROUND |

INPUT/OUTPUT APPARATUS HAVING AN IDENTIFICATION TERMINAL

CROSS REFERENCES TO RELATED APPLICATIONS

The present application is a national stage of International Application No. PCT/JP2012/057115 filed on Mar. 21, 2012 and claims priority to Japanese Patent Application No. JP2011-075325 filed on Mar. 30, 2011, JP2011-170372 filed on Aug. 3, 2011, and JP2012-036951 filed on Feb. 23, 2012, the disclosure of which is incorporated herein by reference.

BACKGROUND

The present disclosure relates to an input/output apparatus obtained by extending the function of an input/output terminal used for input/output of an information terminal device.

To receive TV broadcasting by an information terminal device such as a mobile phone, one of the method of providing a dedicated receiving antenna inside the information terminal device and the method of capturing antenna input from an earphone terminal to listen to an audio signal is generally used.

In addition, TV sets can now be easily moved through the miniaturization thereof and there is also a desire to receive TV broadcasting in a room in which there is no antenna receptacle for TV broadcasting such as a kitchen in the home. In such a case, using a power transmission cable as an antenna for TV broadcasting is proposed (see, for example, Patent Literature 1).

According to the technology described in Patent Literature 1 the distance between an inductor for high-frequency cutoff provided on the side of a power supply circuit of a power transmission cable and an inductor for high-frequency cutoff provided on the side of a mobile terminal is set to an integral multiple of the ¼ wavelength of the carrier frequency of received TV broadcasting or the like. Accordingly, TV broadcasting or the like in a wide frequency band can be received.

Also, a receiving apparatus capable of obtaining sufficient antenna characteristics even if a connector is shared when a cable used as an antenna is caused to transmit another signal whose frequency overlaps is proposed by the present inventors (see Patent Literature 2).

CITATION LIST

Patent Literature

Patent Literature 1: JP 2010-157991A
Patent Literature 2: JP 2010-219904A

SUMMARY

Technical Problem

However, a conventional earphone antenna or an antenna using a power transmission cable needs a special cord or cable for the antenna and there arises a problem that, for example, it is difficult to use the antenna also for other signal transmission. In addition, providing a special antenna inside an information terminal device constitutes an obstacle to slimming down and miniaturization of the information terminal device.

The present disclosure is developed in view of the above problems and an object thereof is to provide an input/output apparatus capable of receiving a radio wave of an FM radio or television via a cable connected to an input/output terminal of an information processing terminal device.

Solution to Problem

To solve the above problems, an input/output apparatus according to the present disclosure uses, among information terminals of an input/output connector provided in an information terminal device, at least one information terminal of the information terminals in which content of information thereof is discriminated based on a potential of an input information signal is also used as an antenna input terminal.

At least the one information terminal is preferably an information terminal used to discriminate a connected device and an ID terminal corresponds to the information terminal when the input/output connector is a USB connector.

An antenna signal input into the antenna input terminal is a broadcast wave signal of one of an FM band, a VHF band, and a UHF band or a plurality of these bands and a capacitor allowing frequencies of the plurality of these bands to pass is connected to a line (for example, an ID line) to which at least one information terminal is connected. In addition, a high-frequency cutoff element having high impedance for the frequency in the bands is connected in parallel with the capacitor to the line to which at least the one information terminal is connected.

Further, in an input/output apparatus according to the present disclosure, good pass characteristics up to the GHz band beyond the UHF band of a television signal can be obtained by devising the arrangement of terminals to which each pin on a substrate of a USB connector is connected.

Advantageous Effects of Invention

According to an input/output apparatus in the present disclosure, there is no need to provide a space of a new connector for an antenna on the side of an information terminal device and therefore, further slimming down and miniaturization of the information terminal device can be realized. In addition, an operation effect of being able to pass signals of a wide band ranging from the MHz band to the GHz band is confirmed.

Additional features and advantages are described herein, and will be apparent from the following Detailed Description and the figures.

BRIEF DESCRIPTION OF THE FIGURES

FIGS. 9(A) and 9(B) are diagrams showing measured frequency-gain (peak gain) characteristics of the earphone antenna in FIG. 7.

FIG. 12 is a diagram showing relations of signal terminals when the USB connector and an MHL connector are shared in the input/output apparatus according to the present disclosure.

DETAILED DESCRIPTION

Figure 1:
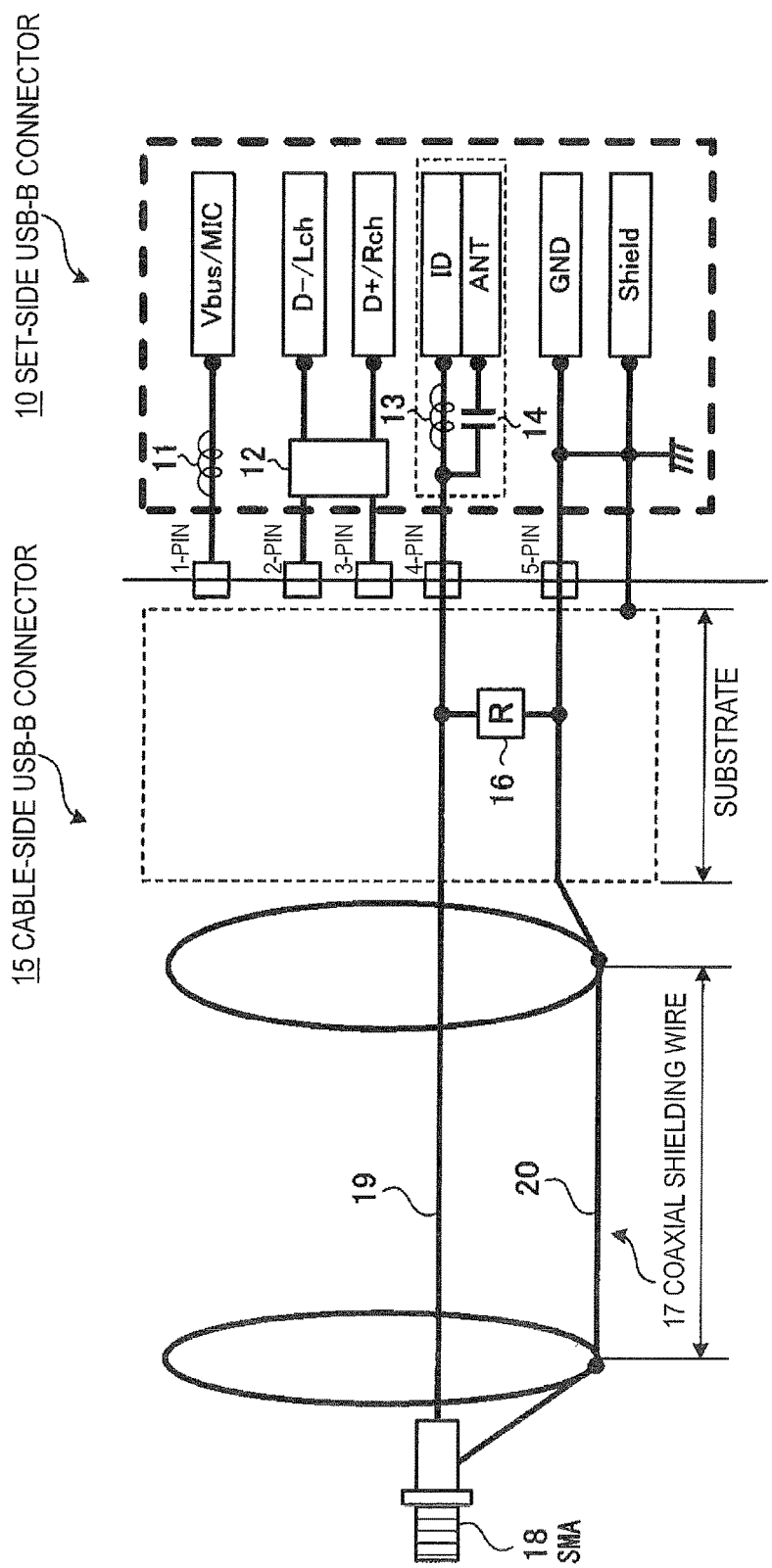
FIG. 1 is a diagram showing an overview of an embodiment of an input/output apparatus according to the present disclosure.
Figure 2:
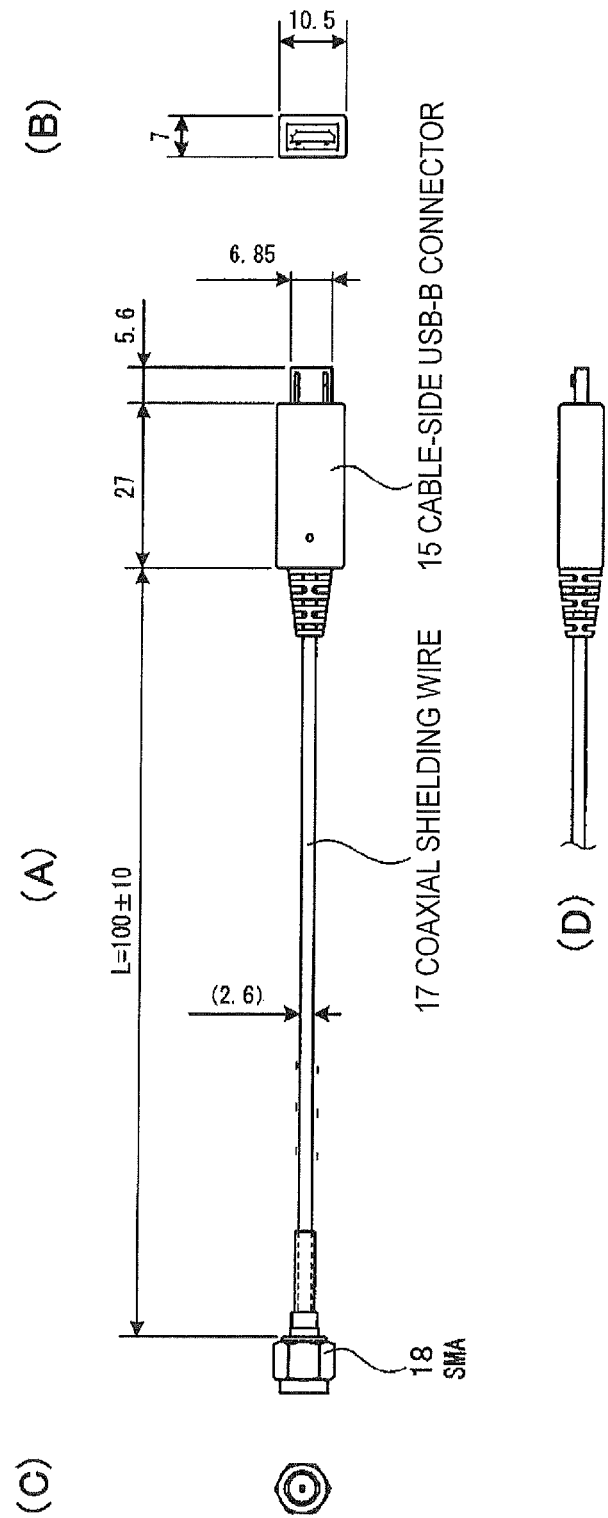
FIGS. 2(A) to 2(D) are diagrams showing examples of a USB-SMA conversion cable having a USB connector connected to one end thereof and an SMA connector connected to the other end thereof.

With further slimming down and miniaturization of recent information terminal devices, it is becoming more difficult to secure a space to provide an antenna needed to receive a radio wave of TV broadcasting on the side of the information terminal device or a special connector connected to an external antenna. For example, many earphone antennas have been proposed by inventors and the like as an antenna to receive a radio wave of TV broadcasting. However, the size of diameter of a terminal for earphone needed for the earphone antenna is also an obstacle to further slim down the information terminal device.

Thus, many thin information terminal devices in recent years are provided with only a USB (Universal Serial Bus) terminal without having any earphone terminal. Such information terminal devices are charged from a host computer and various signals are transmitted between the host computer and the information terminal devices by using the USB terminal.

To solve the above problems, the inventors considered using the USB terminal always mounted on an information terminal device so as to be able to receive TV broadcasting. Then, the inventors tried various ideas and experiments. As a result, the inventors contrived an input/output apparatus capable of receiving a radio wave of TV broadcasting or the like without providing a terminal for earphone or a special connector for an external antenna.

Hereinafter, an embodiment disclosed herein (hereinafter, called the "present example") will be described with reference to FIGS. 1 to 7 and the description will be provided in the following order. Though an input/output apparatus using the USB terminal will be described below, the present disclosure is not limited to the USB input/output apparatus.

1. Connection verification of a USB-SMA conversion cable to an external antenna
2. Concrete example of the USB-SMA conversion cable
3. Verification of maintenance of a USB function
4. Connection example of a coaxial cable and a USB cable
5. Application example to an earphone antenna
6. Substrate structure of a USB input/output apparatus to obtain pass characteristics in the GHz band <1. Connection Verification of a USB-SMA Conversion Cable to an External Antenna>

FIG. 1 is a diagram showing an example of an input/output apparatus of the present example. As shown in FIG. 1, a female USB connector for USB cable connection is provided on the side of an information terminal device (hereinafter, also called a "set" or "set substrate"). The USB connector provided on the set side will be called a "set-side USB-B connector 10" below.

Then, a male USB connector is attached to one end of a coaxial shielding wire of an appropriate length an SMA (Sub Miniature Type A) connector is attached to the other end. Hereinafter, the male USB connector will be called a "cable-side USB-B connector 15" to distinguish from the set-side USB-B connector 10. The SMA connector is normally used as a measuring connector. The set-side USB-B connector 10 is a portion indicated by a thick dotted line in FIG. 1 and the cable-side USB-B connector 15 is a portion indicated by a thin dotted line in FIG. 1. Each connector is connected by 1-pin to 5-pin and fixed onto a substrate. This relation also applies to FIGS. 6 and 8 described later.

First, a general structure of the USN connector will be described with reference to FIG. 1 and then, a concrete configuration of a USB input/output apparatus in the present example will be described.

In general, the set-side USB-B connector 10 (female type) and the cable-side USB-B connector 15 (male type) each have five connection pins indicated by 1-pin to 5-pin and a shielding terminal. A μUSB-B connector is normally used as the set-side USB-B connector 10 and the cable-side USB-B connector 15.

The B connector is a connector used generally on the set side and, by contrast, as will be described with reference to FIG. 5, an A-type USB connector capable of supplying power from the side of a host computer is normally used as a USB connector connected to the side of the host computer.

Incidentally, using the A-type or AB-type (connector used for both the host side and the set side) μUSB connector as a set-side USB connector in recent years, but the set-side USB connector is handled as the B type and the host side USB connector is handled as the A type here.

As shown in FIG. 1, 1-pin of the set-side USB-B connector 10 is a Vbus/MIC terminal for voltage supply and power is fed from the side of the host computer (not shown) to the information terminal device (set) via 1-pin and also a voltage is supplied to an earphone microphone or the like connected to the set. A ferrite bead 11 for high-frequency cutoff is connected in series to a line to which 1-pin of the set-side USB-B connector 10 is connected. Hereinafter, the ferrite bead may be abbreviated simply as "FB".

2-pin and 3-pin of the set-side USB-B connector 10 are terminals of a signal line related to transmission and reception of a differential signal and when an audio signal is input into these terminals, 2-pin (D− terminal) functions as a terminal of an L channel and 3-pin (D+ terminal) functions as a terminal of an R channel. A common mode choke 12 is connected to a line to which 2-pin and 3-pin used for differential are connected. Then, high-frequency signals are cut off and only an audio signal is passed by the common mode choke 12. In the description that follows, the high-frequency signal may also be called an "RE signal" or "antenna signal".

4-pin of the set-side USB-B connector 10 is an ID terminal (ID is an abbreviation of Identification, also called an "identification terminal") to identify the type of an inserted plug and the use to which the plug is applied.

In the set-side USB-B connector 10 in the present example, as shown in FIG. 1, 4-pin used as the ID terminal is used as an antenna terminal to receive TV broadcasting or the like. Thus, a capacitor 14 of about 1000 pF is connected in series to a line to which 4-pin is connected and an antenna signal supplied to 4-pin via the capacitor 14 is supplied to a tuner circuit (not shown) (ANT in FIG. 1) in the set.

4-pin of the set-side USB-B connector 10 is also a pin used as a normal ID terminal, High-frequency signals of television and the like are not needed to realize the function as a normal ID terminal and an FB 13 as a high-frequency cutoff element is connected in parallel with the capacitor 14 to the line to which 4-pin is connected to remove such high-frequency signals. Accordingly, an ID signal from which high-frequency antenna signals such as a television signal have been removed is output to an ID identification circuit (not shown) on the set side.

Incidentally, 5-pin of the set-side USB-B connector 10 is a ground terminal for grounding and a line to which 5-pin is connected is connected and grounded to an external shield of the cable-side USB-B connector 15 and set described later.

The USB-SMA conversion cable shown in FIG. 1 is, as described above, a so-called coaxial cable in which the male cable-side USB-B connector 15 is connected to a substrate provided at one end of a coaxial shielding wire 17. Like the set-side USB-B connector 10, a μUSB connector is used also for the cable-side USB-B connector 15 and, in addition to the B type, a μUSB connector of the A type or AB type may also be used.

A resistor 16 is connected between the ID terminal (4-pin) of the cable-side USB-B connector 15 and a ground line and a USB connector for which use is connected with the value of the resistor 16 and how a cable thereof is used can be recognized from the set side.

Currently, the resistor 16 is defined only for an earphone, but will be used also for other purposes other than the earphone in the future. However, whether power is supplied is recognized by, as will be described later, applying a voltage to a Vbus terminal and shorting 2-pin (D− terminal) and 3-pin (D+ terminal) to start charging.

An SMA connector 18 shown in FIG. 1 is a terminal to which an external antenna line or a cable from an antenna terminal of the home or the like is connected and is known generally as a measuring connector. The characteristic impedance of the SMA connector 18 is 50Ω and the SMA connector 18 has long been used for wireless communication devices of mainly microwaves. We performed an experiment of receiving a broadcast wave such as a television signal on the set side using a USB-SMA conversion cable shown in FIG. 1.

More specifically; as shown in FIG. 1, a core wire 19 as an inner conductor of the coaxial shielding wire 17 cut into lengths of about 10 cm is connected to a line of 4-pin of the cable-side USB-B connector 15. In addition, a metal shield 20 as an outer conductor of the coaxial shielding wire 17 is connected to a line of 5-pin of the cable-side USB-B connector 15. The USB-SMA conversion cable is produced by leaving 1-pin to 3-pin of the cable-side USB-B connector 15 open with nothing being connected.

<2. Concrete Example of the USB-SMA Conversion Cable>

FIGS. 2(A) to 2(D) show samples of the above USB-SMA conversion cable. FIG. 2(A) is a plan view viewed from above, FIG. 2(B) is a sectional view of the cable-side USB-B connector 15, FIG. 2(C) is a sectional view of the SMA connector 18, and FIG. 2(D) is a front view. The dimension of each figure is based on the standard of the USB connector and SMA connector. In FIGS. 2(A) to 2(D), the same reference signs are attached to the same members as those in FIG. 1.

As shown in FIGS. 2(A) to 2(D), the coaxial shielding wire 17 of about 10 cm m length and 2.6 mm in diameter is used as a sample of the produced USB-SMA conversion cable. As shown in FIG. 2(B), the narrower side of the cable-side USB-B connector 15 having a rectangular section has a width of 7 mm, which is suitable as a connection terminal of a mobile phone or the like for which further slimming down in the future is expected.

Figure 3:
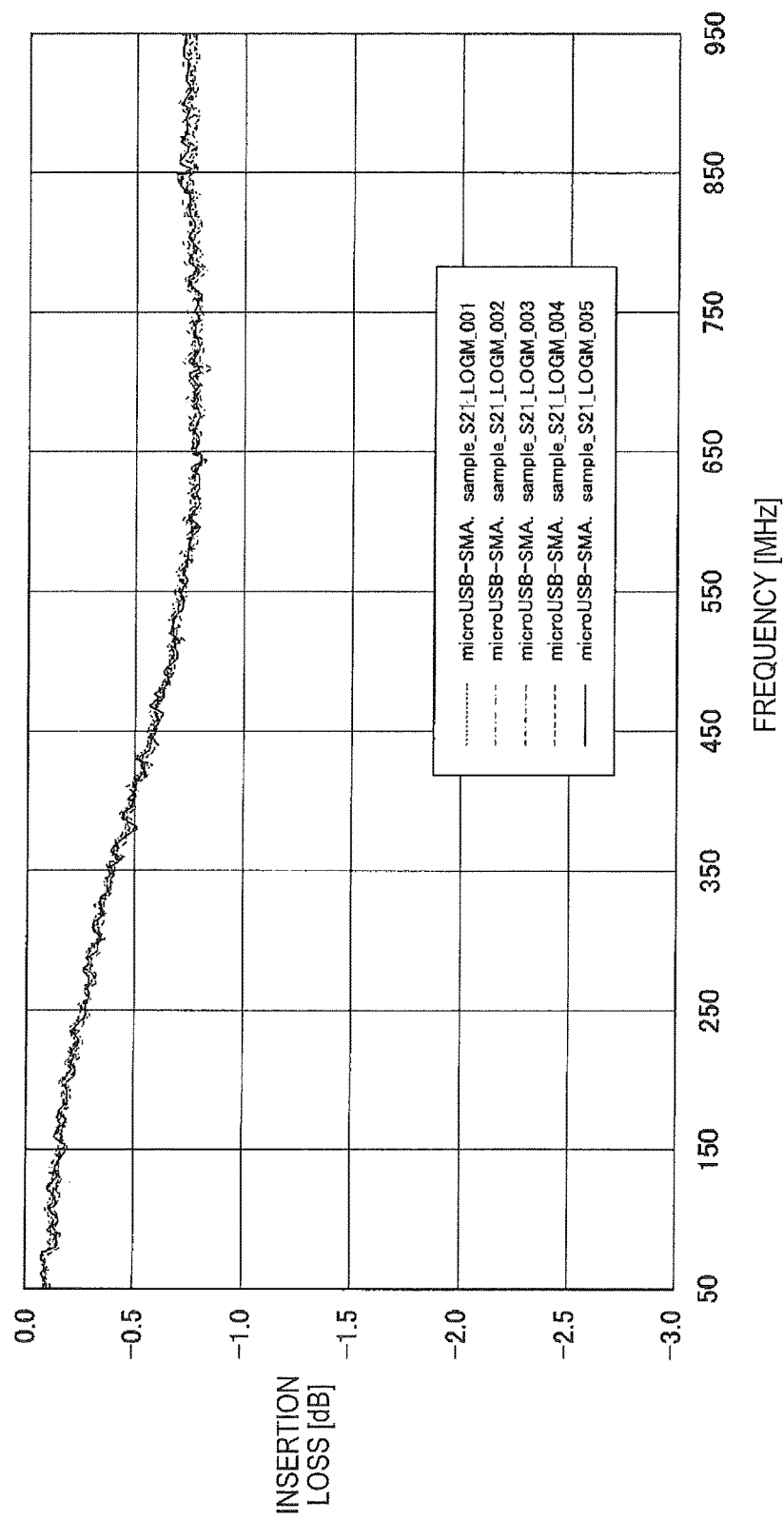
FIG. 3 is a diagram showing that frequency characteristics of samples (five) of the USB-SMA conversion cable shown in FIGS. 2(A) to 2(D) yielded substantially the same results.

Five samples of the USB-SMA conversion cable shown in FIGS. 2(A) to 2(D) are successively connected to the set-side USB-B connector 10 to examine transmission characteristics of a high-frequency signal such as a television wave. FIG. 3 is a diagram obtained by plotting the result.

In the Japanese television broadcasting, the VHF band of 90 to 108 MHz (1 to 3 ch) and 170 to 222 MHz (4 to 12 ch) and the UHF band of 470 to 770 MHz (13 to 62 ch) are used. Incidentally, the VHF band may be divided to call 90 to 108 MHz as the VHF-L (low) band and 170 to 222 MHz as the VHF-H (high) band.

Viewing FIG. 3 shows that pass characteristics of high-frequency signals in all bands of TV broadcasting yield substantially the same results for five samples of the USB-SMA conversion cable. That is, insertion losses of five samples of the USB-SMA conversion cable are 1 dB or less in all frequency bands of the FM band (70 to 90 MHz), the VHF band, and the UHF band, which shows that transmission degradation is small. The above result shows that practically no problem is caused if the ID terminal of an ordinary USB cable is used for reception of an antenna signal of television or the like.

<3. Verification of Maintenance of a USB Function>

Figure 4:
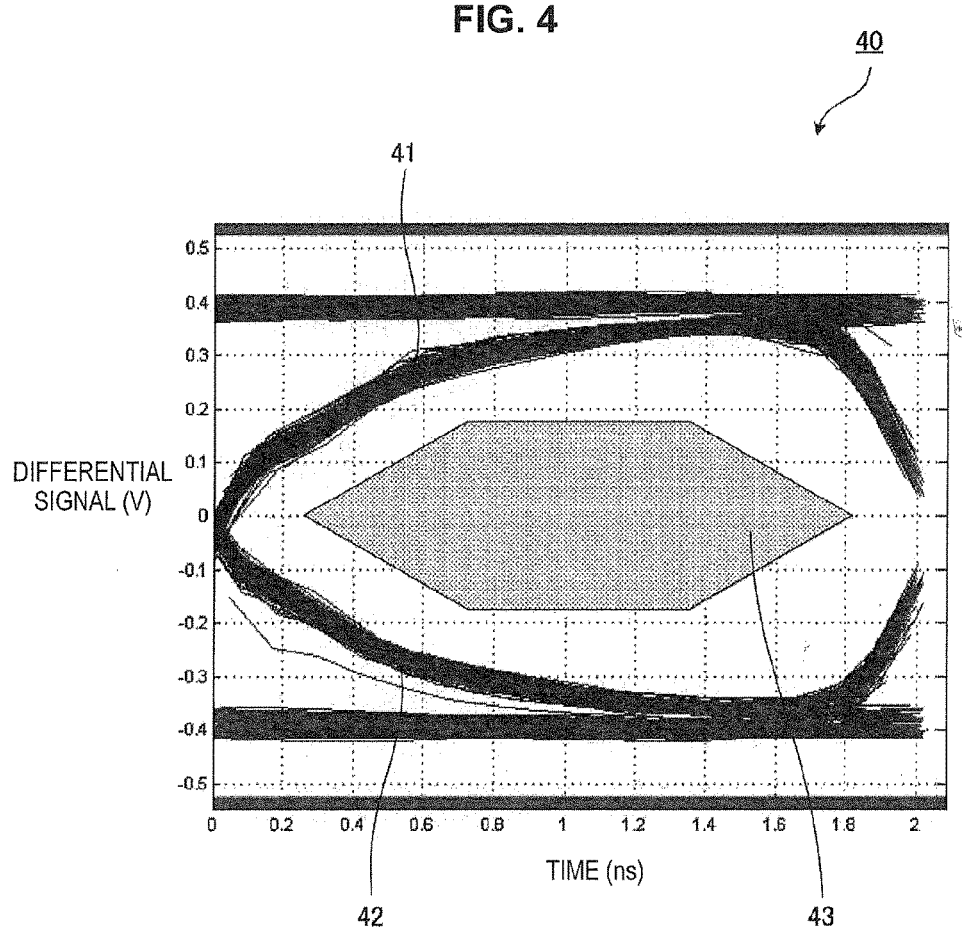
FIG. 4 is a diagram showing an eye pattern obtained by performing a transmission test of a differential signal of USB 2.0 using the USB-SMA conversion cable shown in FIGS. 2(A) to 2(D).

We also verified whether the original USB function is maintained, in other words, whether the USB function is degraded by using the ID terminals of the set-side USB-B connector 10 and the cable-side USB-B connector 15 for antenna transmission. FIG. 4 is a diagram showing an eye pattern 40 to examine whether the USB function is maintained.

The eye pattern 40 is also called an eye diagram or an eye opening ratio and is created by sampling and superimposing the transition of a signal waveform many times and graphically showing the result. The horizontal axis represents the time and the vertical axis represents the voltage. If the eye pattern 40 is viewed and a plurality of signal waveforms is superimposed in the same position (timing and voltage), the waveform is considered to be a high-quality waveform and conversely, if positions (timing and voltage) of signal waveforms are shifted, the waveform is considered to be a low-quality waveform. It is also known that a waveform of degraded transmission characteristics has a hexagonal shape (template 43) in the center that is thin and flat and the area thereof is small.

In the standard satisfying conditions for the USB 2.0 function, differential signals 41, 42 passing signal lines of D+=0.4 V and D−=−0.4 V and having a phase difference of 180° are simultaneously displayed and the waveform of the differential signals is required to surround the hexagonal template 43 in the displayed eye pattern. In the standard of USB 2.0, the clock of USB signal transmission is 480 Mbps.

The test is called an eye pattern test (or an eye diagram test) because the relation between the signal lines and the template is similar to the shape of an open human eye.

Viewing FIG. 4 shows that the differential signals 41, 42 propagated through the line to which 2-pin and 3-pin are connected are positioned between parallel lines of D+=0.4 V, D−=−0.4 V and further, the hexagonal template 43 is positioned inside a region surrounded by these two differential signals 41, 42. That is, FIG. 4 shows that if 4-pin of the USB terminal is used as an antenna, the eye pattern test is passed, in other words, the USB standard is satisfied. From the above, it is clear that the USB function is maintained even if a dipole antenna or an external antenna is connected to the SMA connector of the USB-SMA conversion cable shown in FIGS. 2(A) to 2(D).

<4. Connection Example of a Coaxial Cable and a USB Cable>

Figure 5:
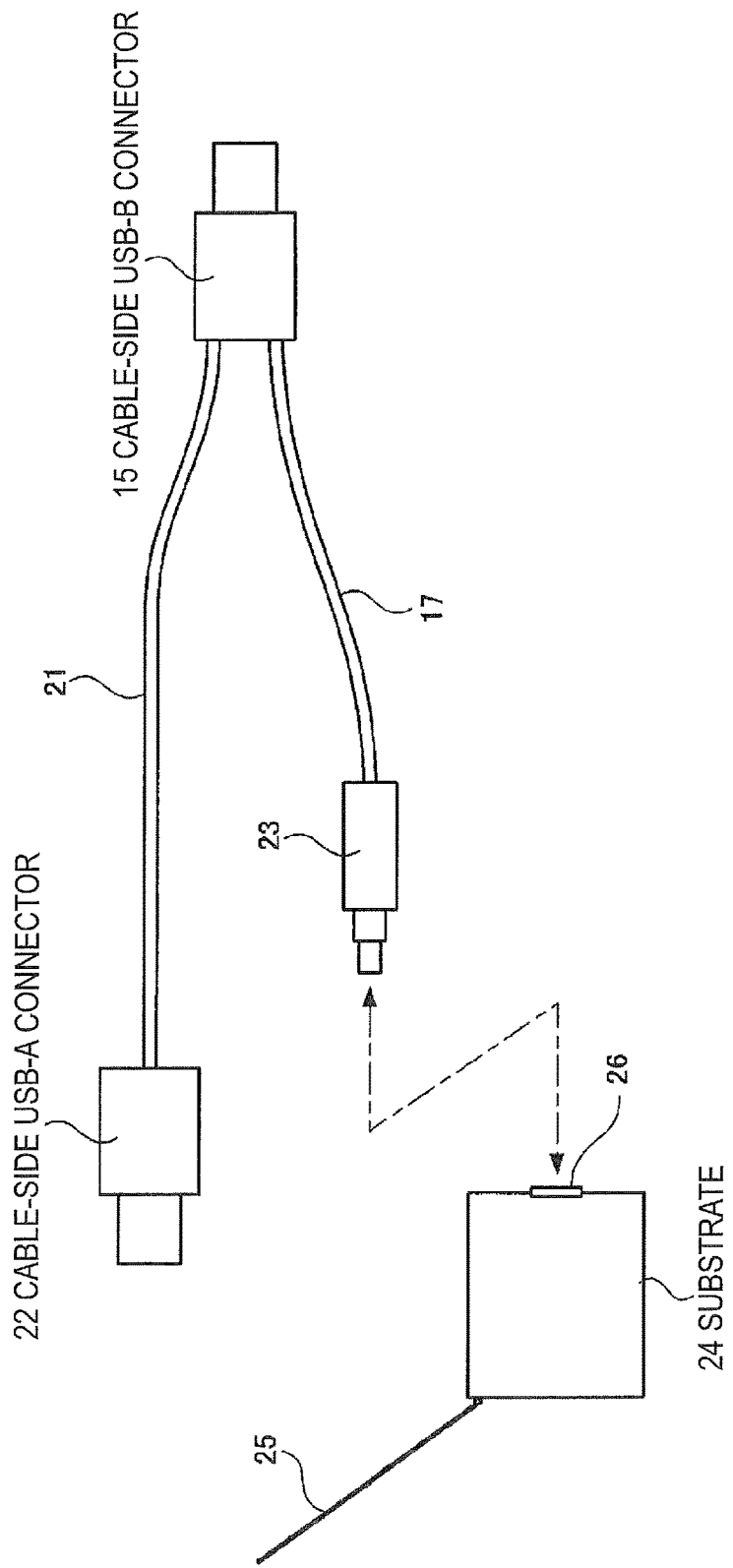
FIG. 5 is a conceptual diagram showing another embodiment in which both of a coaxial cable and a USB cable to connect to an external antenna unit are connected to the input/output apparatus according to the present disclosure.
Figure 6:
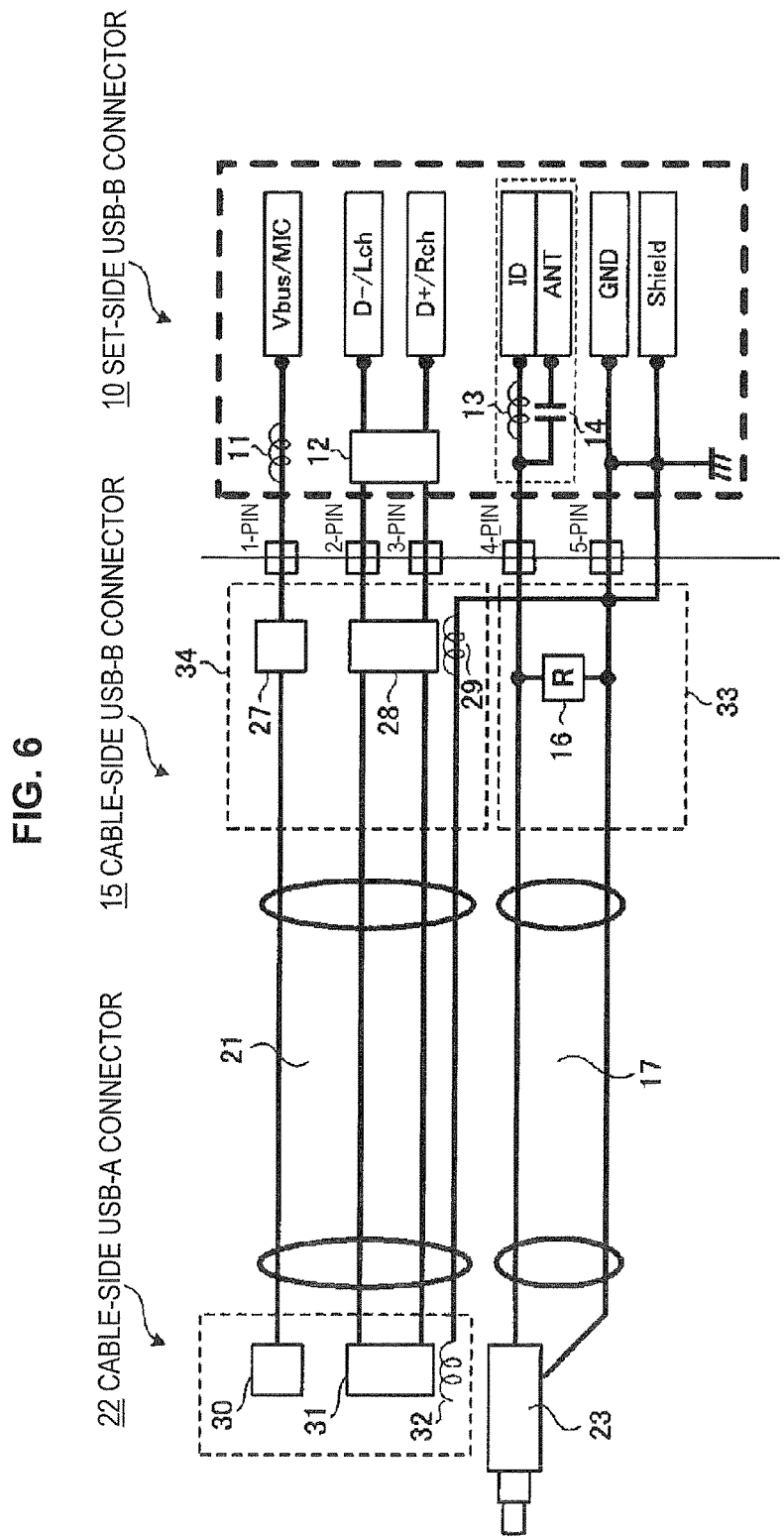
FIG. 6 is a diagram showing concrete connecting relations when both the coaxial cable and the USB cable in FIG. 5 are connected to a USB input/output apparatus.

FIGS. 5 and 6 show an embodiment in which two cables, a coaxial cable similar to the USB-SMA conversion cable shown in FIG. 1 and an ordinary USB cable, are connected to an input/output apparatus. FIG. 5 is a schematic block diagram and FIG. 6 is a diagram showing connecting relations thereof in detail. Incidentally, FIG. 5 shows an example in which, instead of the SMA connector 18 (see FIG. 1), a double-pole plug 23 whose diameter is 3.5 mm is connected to the other end of the coaxial cable 17. The double-pole plug 23 is called a "Φ3.5 double-pole plug". Instead of the double-pole plug 23, the SMA connector 18 or an F connector normally used in the television may also be used. Hereinafter, the cable that receives a broadcast wave such as the television signal shown in FIGS. 1, 2(A) to 2(D), 5, and 6 will called simply the "coaxial cable" to distinguish from the USB cable.

In the connection example shown in FIG. 5, in addition to the coaxial cable (coaxial shielding wire) 17, a USB cable 21 is connected to the cable-side USB-B connector 15. Then, a cable-side USB-A connector 22 to connect to the host computer side is connected to the other end of the USB cable 21. In addition to power being supplied from the host computer (not shown) side to the set side, various information signals including an audio signal are supplied through the USB cable 21.

The F connector normally used for input of the television is connected to the other end of the coaxial cable 17 to connect to an antenna terminal in the home.

However, there is also a desire to receive a TV broadcast wave by using a dedicated retractable rod antenna when using an information terminal device. Thus, the case of connecting and using the above double-pole plug 23 or other small coaxial connectors, instead of the SMA connector 18, is expected to increase in the future.

The double-pole plug 23 is used by being inserted into a double-pole jack 26 as a connector of a substrate 2'4 of an antenna unit having a rod antenna 25. The double-pole jack 26 of the substrate 24 is called a "Φ3.5 double-pole jack", By connecting the double-pole plug 23 and the double-pole jack 26, an information terminal device (set) and an antenna for television signal reception can directly be connected. Thus, even if the USB cable 21 is connected, noise from the side of the host computer is resisted so that a broadcast wave can be received with stability. In addition, the antenna unit is a separate body and so can advantageously be carried.

FIG. 6 is a detail view showing details of the connecting relation in FIG. 5 at a pin level of a USB input/output terminal. The same reference signs are attached to the same members as those in FIG. 1. The structure of the set-side USB-B connector 10 is the same as that shown in FIG. 1 and thus, the description thereof is omitted.

As shown in FIG. 6, the cable-side USB-B connector 15 is connected to the set-side USB-B connector 10 as a USB input/output apparatus. In the example of FIG. 1, as described above, only the coaxial cable (USB-SMA conversion cable) 17 is connected to the cable-side USB-B connector 15.

In the connection example shown in FIG. 6, in addition to the coaxial cable 17 to which the double-pole plug 23 is connected, the ordinary USB cable 21 is connected to one end of the cable-side USB-B connector 15. As shown in FIG. 5, the B-type cable-side USB-B connector 15 is connected to one end of the USB cable 21 and the A-type cable-side USB-A connector 22 to connect to a host computer is connected to the other end thereof. The FB 27 for high-frequency cutoff is connected on the set side to 1-pin to which the power supply line of the USB cable 21 is connected and also the FB 30 for high-frequency cutoff is similarly connected thereto on the host side. The FB 27, 30 are ferrite beads (FB) capable of maintaining high-frequency characteristics even if a current flows and characteristics thereof are different from those of FB 29, 32 connected to a ground line described later.

Common mode chokes 28, 31 are connected to 2-pin and 3-pin to which the differential signal line of the USB cable 21 is connected to the set side and the host side respectively. Further, the FB 29 is connected to the ground line of the USB cable 21 on the set side and the FB 32 is connected thereto on the host side. The FB 29, 32 inserted into the ground line have a magnetic material arranged around a coil to create a state of high impedance at high frequencies, that is, a state of large high-frequency losses. Then, a high-frequency current is converted into heat to remove the high-frequency current.

However, under the assumption that USB characteristics and RF characteristics of the coaxial cable 17 are maintained, the FB 30 and the common mode choke 31 on the host side and the FB 32 connected to the ground line may be omitted if the influence of power supply noise is small in terms of characteristics of the USB cable 21.

Incidentally, when the substrate to which the cable-side USB-B connector 15 is connected is used as a common substrate, the substrate and the connector should be separated as far apart as possible in consideration of prevention of mutual interference. Here, a first substrate 33 to which the coaxial cable 17 is connected and a second substrate 34 to which the USB cable 21 is connected are separate. The first substrate 33 becomes a first connection portion and the second substrate 34 becomes a second connection portion. Crosstalk between a signal on the side of the USB cable 21 and a signal on the side of the coaxial cable 17 can be eliminated by the separation so that a broadcast wave can be received with more stability on the side of the coaxial cable.

Thus, by attaching both of the USB cable 21 and the coaxial cable 17 to the cable-side USB-B connector 15, communication with the host computer and charging using the USB cable 21 and reception of a broadcast wave from an antenna unit using the coaxial cable 17 become possible simultaneously.

<5. Application Example to an Earphone Antenna>

Figure 7:
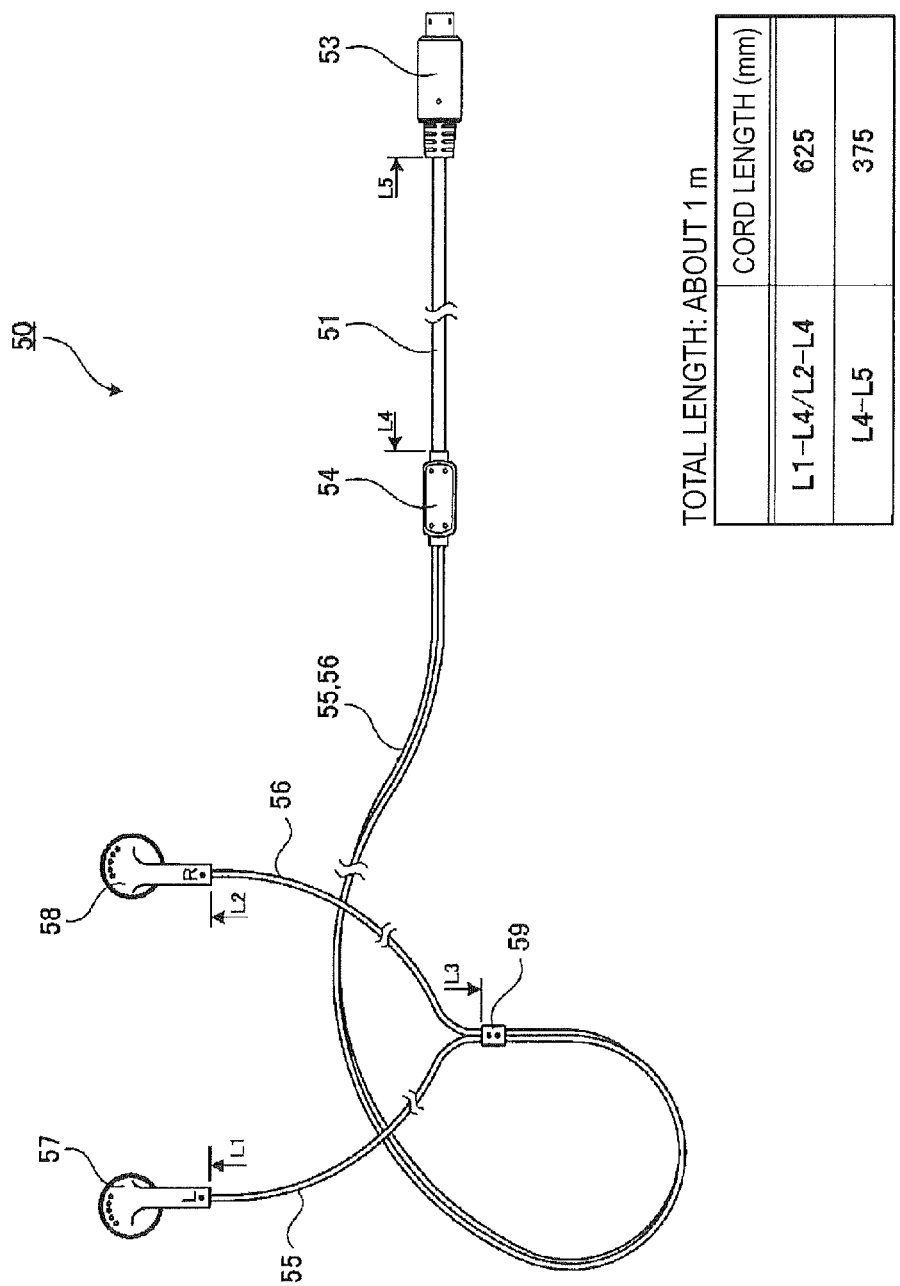
FIG. 7 is a diagram showing an example of an earphone antenna produced by connecting the USB cable and an earphone cord.

FIG. 7 is a diagram showing an earphone antenna 50 of about 1 m in total length produced by connecting a coaxial shielding wire 51 of 37.5 cm in length and earphone cords 52, 53 of 62.5 cm in length.

The earphone antenna 50 is a kind of monopole antenna and configures an antenna capable of receiving a radio wave in the VHF band for TV broadcasting with the length of all of the coaxial shielding wire 51 and the earphone cords 52, 53, and configures an antenna capable of receiving a radio wave in the UHF band for TV broadcasting by the portion of the coaxial shielding wire 51.

A male cable-side USB-B connector 53 attached to the coaxial shielding wire 51 to connected to a set is the same as the cable-side USB-B connector 15 in FIG. 1, but has, as will be described with reference to FIG. 8, a different connection configuration of 1-pin to 5-pin.

On the other hand, the connector connected to earphone cords 55, 56 is not the SMA connector 18 shown in FIGS. 2(A) to 2(D), but a connection portion 54 to connect the ordinary earphone cord 55, 56 and the coaxial shielding wire 51 via a substrate and the connection portion 54 is molded from resin. The connection portion 54 becomes a boundary between the earphone cord 55, 56 and the coaxial shielding wire 51. The earphone cords 55, 56 are integrally connected up to a fixing portion 59, but are separated in the fixing portion 59 to be connected to an L-side earphone 57 and an R-side earphone 58 respectively In the present example, a resin mold via a substrate is formed for the connection of the coaxial shielding wire 51 and the earphone cords 55, 56, but instead, the connection of an earphone jack and an earphone plug may also be configured.

The total length of the earphone antenna 50 is set to about 1 m and the length of the coaxial shielding wire 51 is set to 37.5 cm. The total length of the earphone antenna is decided here in consideration of the fact that the frequency further decreases when the antenna is mounted on a human body and used. That is, in the earphone antenna 50, the length of the coaxial shielding wire is adjusted to 37.5 cm, which is about ¼ the wavelength (λ/4) of 200 MHz, so that both of the VHF-H band and the UHF band of TV broadcasting can be received. Because the UHF band (440 to 770 MHz) corresponds to a high-frequency band of approximately 200 MHz, a radio wave of TV broadcasting in the UHF band can also be received by the earphone antenna 50.

Figure 8:
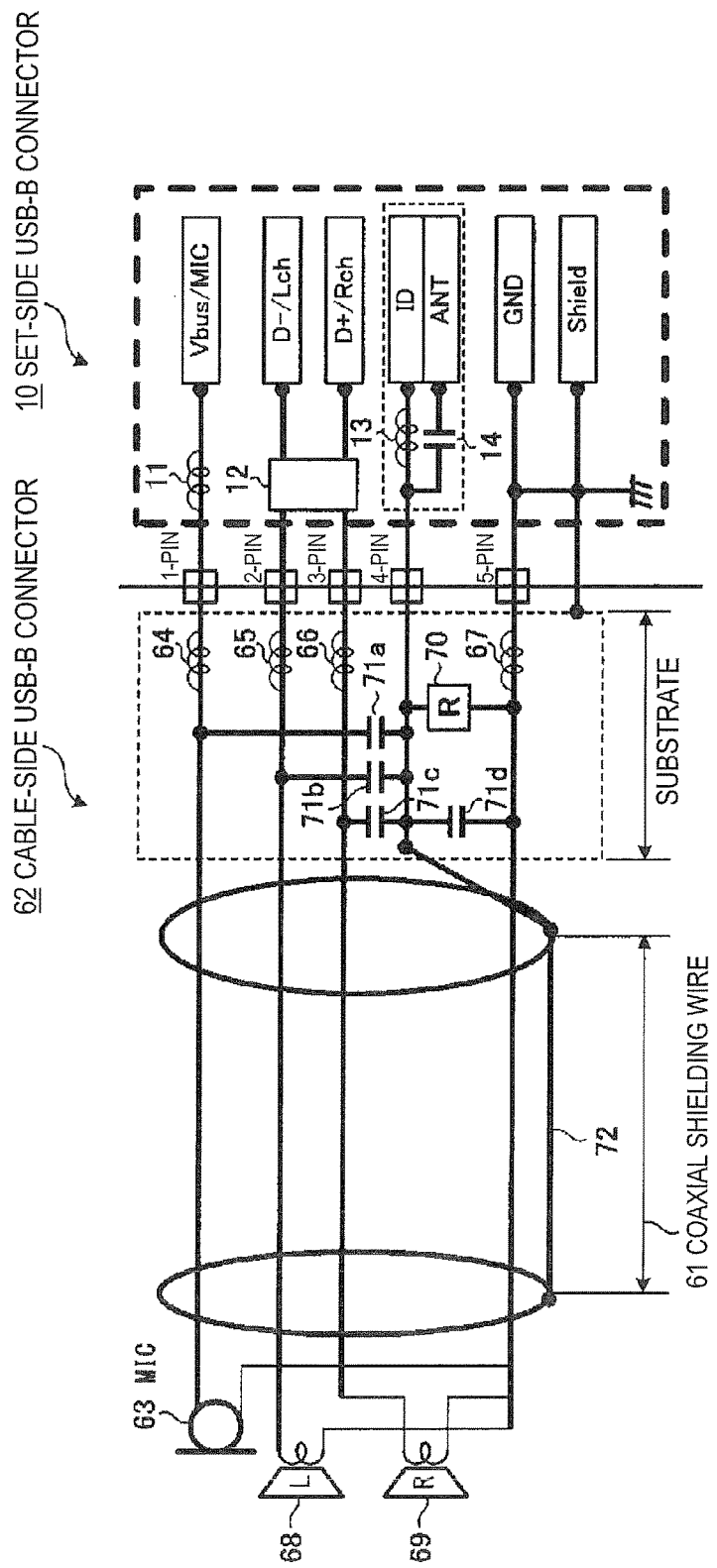
FIG. 8 is a diagram showing a concrete connection configuration of the earphone antenna in FIG. 7.

FIG. 8 is a diagram showing a concrete connecting relation of an earphone antenna 60, which is the same as the earphone antenna 50 shown in FIG. 7. A cable-side USB-B connector 62 connected to a coaxial shielding wire 61 is a male connector and is connected to the female set-side USB-B connector 10. The female set-side USB-B connector 10 attached to the side of the set substrate is the same as the connector shown in FIG. 1 and so the description thereof is omitted.

In the example of FIG. 8, the length of the coaxial shielding wire 61 is set to 37.5 cm, which is the same length as that of the coaxial shielding wire 51 in FIG. 7. The cable-side USB-B connector 62 provided on the substrate on the side of the coaxial shielding wire 61 is different from the cable-side USB-B connector 15 in FIG. 1 in a line configuration connected to each terminal (1-pin to 5-pin) of the cable-side USB-B connector 62.

The male cable-side USB-B connector 62 arranged on the substrate on the side of the coaxial shielding wire 61 is provided opposed to the female set-side USB-B connector 10 arranged on the side of the set substrate. 1-pin of the cable-side USB-B connector 62 is a terminal or power supply and is connected to a microphone 63 and further, an FB 64 to cut off high-frequency signals is connected in series to the line.

2-pin and 3-pin of the cable-side USB-B connector 62 are connected to a signal line that transmits R and L audio signals by differentials and FB 65, 66 for high-frequency cutoff are also connected to the line. Further, an FB 67 is connected to 5-pin as a ground line of the cable-side USB-B connector 62. To satisfy both of the ordinary USB cable transmission function and the antenna function of a high-frequency signal like a television signal, the DC resistance of the FB 67 inserted into the ground line is desirably 1Ω or less.

Thus, it is preferable to set the value of resistance of the FB 67 to 1Ω or less, but if it should be impossible to achieve audio isolation with the value of 1Ω, the value of the FB 67 may be set to 0Ω for use. That is, though antenna characteristics are degraded, the ID terminal of 4-pin can be used as an antenna terminal without the FB 67. If slight degradation of high band characteristics of UHF is permitted, the function as an antenna terminal can be maintained without inserting a capacitor 71d between a line of the ID terminal and the ground line.

Lines of 1-pin, 2-pin, and 3-pin of the cable-side USB-B connector 62 are connected to the ground line (line of 5-pin) via the microphone 63 and L and R earphones 68, 69.

Particularly in the earphone antenna 60 of the present example, as will be described later, the fact that a metal shield 72 as an outer conductor of the coaxial shielding wire 61 is connected to the ID terminal (4-pin) of the cable-side USB-B connector 62 has an important meaning. As shown in FIG. 6, the metal shield 72 connected to the ID terminal is a shielding line that is different from the ground line.

When the male cable-side USB-B connector 62 is inserted into the female set-side USB-B connector 10, it is necessary to discriminate (detect) whether an antenna capable of receiving a radio wave of TV broadcasting or the like is inserted. Thus, a resistor 70 is inserted between the line to which the ID terminal (4-pin) of the cable-side USB-B connector 62 and the ground line to which 5-pin is connected. Different values of resistance are set as the value of resistance of the resistor 70 depending on the type of the cable-side USB-B connector 62, in other words, for which purpose the connector is used. Therefore, by detecting the value (value of resistance) of the resistor 70, whether a USB connector having an antenna function of TV broadcasting or the like is inserted can be detected.

When a radio wave of TV broadcasting or the like is received by a conventional earphone antenna, generally a signal line constituting an R earphone cable and a signal line constituting an L earphone cable are each caused to function as an antenna line. In the earphone antenna, a radio wave is transmitted between the core wire of a coaxial cable and the ground line and a transmitted antenna signal is input into a receiver of TV broadcasting or the like by a pin jack connector.

However, the transfer clock used for signal transfer in USB 2.0 is 480 Mbps and a clock signal operates between the signal line and the ground line and thus, if the ground of a USB cable is used as an antenna of a television signal, the antenna is in a state in which the clock signal of 480 Mbps of USB is superimposed on a RF signal of television or the like. Therefore, when the USB cable is used as an antenna for TV broadcasting, the USB cable cannot be used for transmission of a high-frequency signal of TV broadcasting or the like if connected in the same way as a conventional earphone antenna. Incidentally, the clock of 480 Mbps in USB 2.0 corresponds to a frequency of 240 MHz and thus, the band particularly affected adversely is the VHF-H band.

In consideration of the above problem of the earphone antenna, an earphone antenna in the present example has, as shown in FIG. 6, capacitors 71a to 71d to promote high-frequency connection inserted between a voltage line (1-pin), a signal line (2-pin, 3-pin), and a ground line (5-pin) and an ID line (4-pin). The value of the capacitors 71a to 71d is approximately 1000 pF.

In addition, the FB 64 to 67 are connected to the line to which 1-pin to 3-pin of the cable-side USB-B connector 62 is connected and the line to which 5-pin is connected so that an antenna signal like a television signal does not enter the set-side USB-B connector 10 through these lines. That is, shielding at high frequencies is created.

Because the earphone antenna 60 shown in FIG. 8 uses the line of the ID terminal for input of the antenna for TV broadcasting, no ferrite bead (FB) is connected to the ID line to which 4-pin is connected. In other words, while the FB 64 to 66 are connected to the lines to which 1-pin to 3-pin of the cable-side USB-B connector 62 are connected and the ground line to which 5-pin is connected, no FB is connected to the line to which 4-pin is connected. That is, only the line of 4-pin is not shielded at high frequencies an antenna signal of television or the like is transmitted to the set side through this line.

Then, a radio wave of an antenna signal generated in each line immediately before these FB 64 to 66 is actively superimposed on the ID line via the capacitors 71a to 71d. This means that the ID line (antenna terminal) and other lines are connected at high frequencies and are open in terms of DC. Therefore, when each line of the USB cable is used for signal transmission or the like, no adverse effect shows up.

Also, as described above, the resistor 70 is connected between the ID line to which 4-pin of the cable-side USB-B connector 62 is connected and the ground line. The value of resistance of the resistor 70 is normally high impedance (hundreds of kΩ) and thus, the ID line and the ground line are open at high frequencies and antenna characteristics are not affected by the ID line. To be noted is a case in which after the FB 64 to 67 connected to each line other than the ID line pass, connection is established by a capacitor such as connection capacity and in this case, a high-frequency current flows to each terminal, which causes degradation of antenna characteristics.

Next, based on Tables 1, 2 and FIGS. 9(A) and 9(B), frequency-gain characteristics of the earphone antenna described with reference to FIGS. 7 and 8 will be described.

Table 1 and FIG. 9(A) show frequency-gain characteristics exhibited by the earphone shown in FIG. 7 in the VHF band of TV broadcasting. In the VHF band of 190 to 220 MHz, as shown in Table 1 and FIG. 9(A), gain characteristics of −10 dB or more are exhibited in vertical polarization and characteristics of −16 dB or more are exhibited in horizontal polarization.

TABLE 1

| | Vertical polarization | | | | | | |
|---|---|---|---|---|---|---|---|
| Frequency [MHz] | 188.5 | 192.5 | 194.5 | 198 | 204 | 210 | 216 | 222 |
| Peak [dBd] | −9.27 | −9.45 | −9.49 | −9.30 | −9.40 | −8.46 | −8.03 | −6.08 |

| | Horizontal polarization | | | | | | |
|---|---|---|---|---|---|---|---|
| Frequency [MHz] | 188.5 | 192.5 | 194.5 | 198 | 204 | 210 | 216 | 222 |
| Peak [dBd] | −16.07 | −15.52 | −15.33 | −14.68 | −13.84 | −12.46 | −11.43 | −9.08 |

In the VHF band of 470 to 870 MHz, as shown in Table 2 and FIG. 9(B), gain characteristics of −12 dB or more are exhibited in both of vertical polarization and horizontal polarization. These results show that the earphone antenna 60 shown in FIG. 8 functions adequately as an antenna of the VHF band and the UHF band of TV broadcasting. These results also mean that the earphone antenna 60 is applicable as an antenna for multimedia broadcasting planned to be broadcast using the VHF band.

TABLE 2

| | Vertical polarization | | | | | | |
|---|---|---|---|---|---|---|---|
| Frequency [MHz] | 470 | 520 | 570 | 620 | 670 | 720 | 77 | 906 |
| Peak [dBd] | −12.00 | −7.80 | −8.53 | −10.61 | −9.67 | −5.15 | −8.65 | −1.88 |

| | Horizontal polarization | | | | | | |
|---|---|---|---|---|---|---|---|
| Frequency [MHz] | 470 | 520 | 570 | 620 | 670 | 720 | 77 | 906 |
| Peak [dBd] | −6.20 | −3.69 | −6.73 | −5.21 | −11.27 | −3.18 | −1.45 | −0.97 |

<6. Substrate Structure of a USB Input/Output Apparatus to Obtain Pass Characteristics in the GHz Band>

Figure 10:
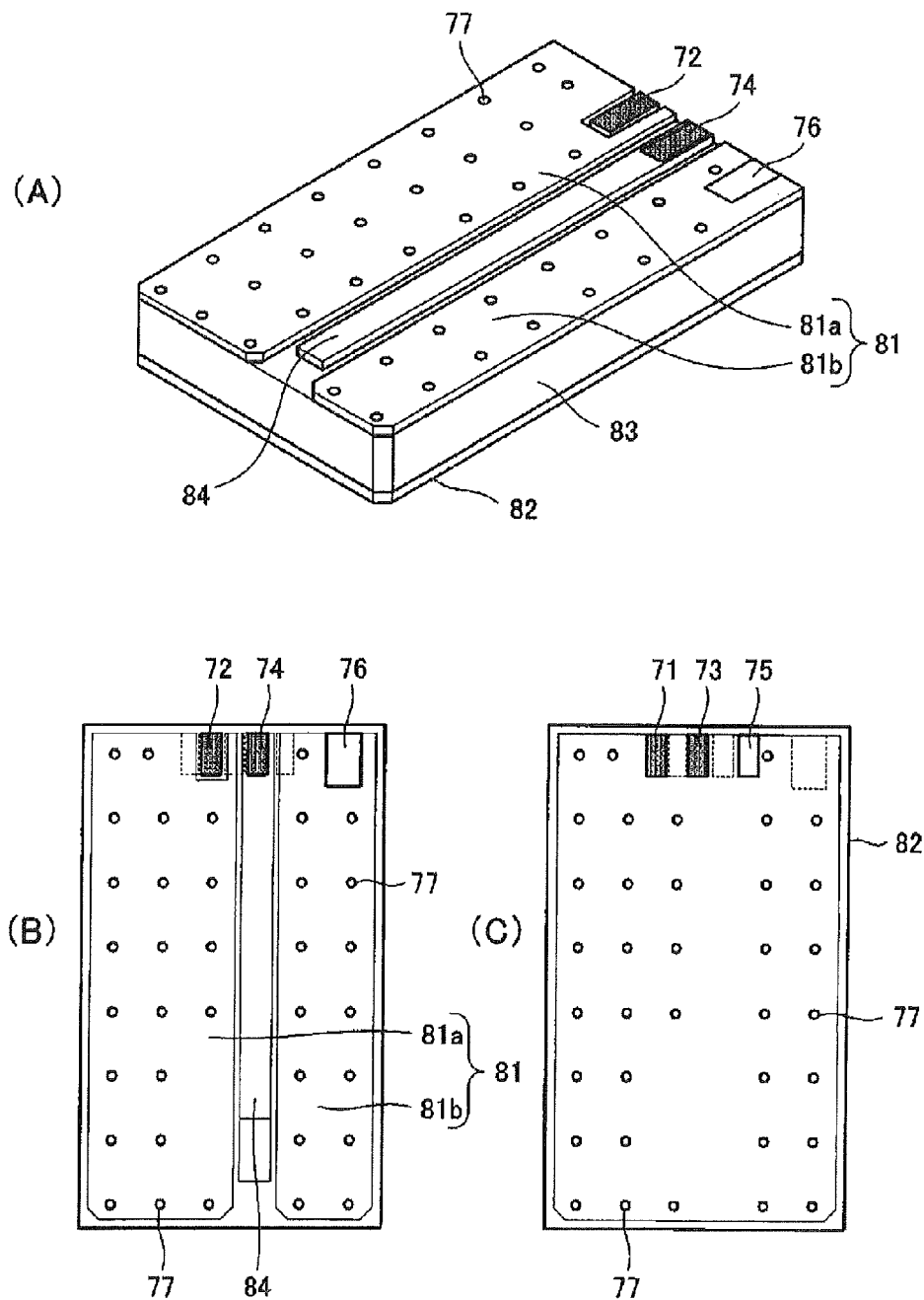
FIGS. 10(A) to 10(C) are diagrams showing substrate structures to obtain pass characteristics in the GHz band by the input/output apparatus according to the present disclosure.

FIGS. 10(A) to 10(C) are diagrams showing substrate structures to obtain pass characteristics in the GHz band by the input/output apparatus according to the present disclosure. FIG. 10(A) is a perspective view of the Whole substrate and FIGS. 10(B) and 10(C) are diagrams showing a physical relationship between two parallel earth faces (earth layers) arranged across a dielectric and a USB input/output apparatus. The substrate is a μUSB plug substrate on which the coaxial shielding wire (coaxial cable) 17 and the cable-side USB-B connector 15 shown in FIG. 1 are implemented.

As shown in FIG. 10(A), a dielectric 83 is arranged between an upper earth face 81 and a lower earth face 82. The earth face 81 and the earth face 82 are connected by a through hole 77 and maintained at a conduction potential. The upper earth face 81 is divided into an earth face 81a and an earth face 82*b* and an electrode 84 to which the ID terminal (4-pin) of USB is connected is provided therebetween.

Electrodes to which 1-pin to 5-pin of the USB terminal are connected are provided on the respective earth faces 81*a*, 81*b*, 82. FIG. 10(B) shows electrodes provided on the earth face 81 of the top face (upper side) and FIG. 10(C) shows the positions of electrodes provided on the earth face 82 of the bottom face (lower side). FIGS. 10(B) and 10(C) are perspective views viewed from above.

As shown in FIG. 10(B), a 2-pin (D− terminal) electrode 72, a 4-pin (ID terminal) electrode 74, and a shielding terminal 76 of the USB connector are arranged in the same plane as the earth faces 81*a*, 81*b* of the top face. Also, as shown in FIG. 10(C), a 1-pin (power supply terminal) electrode 71, 3-pin (D+ terminal) electrode 73, and a 5-pin (GND terminal) electrode 75 are arranged in the same plane as the earth face 82 of the bottom face. The shielding terminal 76 is directly connected to the earth face 81*a* and the 5-pin (GND terminal) electrode 75 is directly connected to the earth face 82. The earth faces 81*a*, 81*b* of the top face and the earth face 82 of the bottom face are electrically connected by the through hole 77.

Viewing the planar structure of the upper earth face 81 shown in FIG. 10(B) and the planar structure of the lower earth face 82 shown in FIG. 10(C) shows that both structures are related as indicated by electrodes denoted by a solid line and the positions of electrodes denoted by a dotted line of the perspective views. That is, the 2-pin electrode 72 of the top face is arranged between the 1-pin electrode 71 and the 3-pin electrode 73 of the bottom face. Also, the 4-pin electrode 74 of the top face is arranged between the 3-pin electrode 73 and the 5-pin electrode 75 of the bottom face. Further, the shielding electrode 76 of the top face connected to the case is arranged on the outer side from the position of the 5-pin electrode 75 of the bottom face.

The mounting method of a USB connector may be the same as a conventional method, but the mounting method of a coaxial line in the present embodiment is devised. That is, the mounting method in the present embodiment adopts a method by which a coating of the coaxial line is removed and a substrate is sandwiched between a core wire portion and a ground portion and then soldered. According to this method, an electromagnetic field is generated when a strip line is between a signal line and the ground at the bottom and thus, pass characteristics of high frequencies can be maintained in good conditions.

Figure 11:
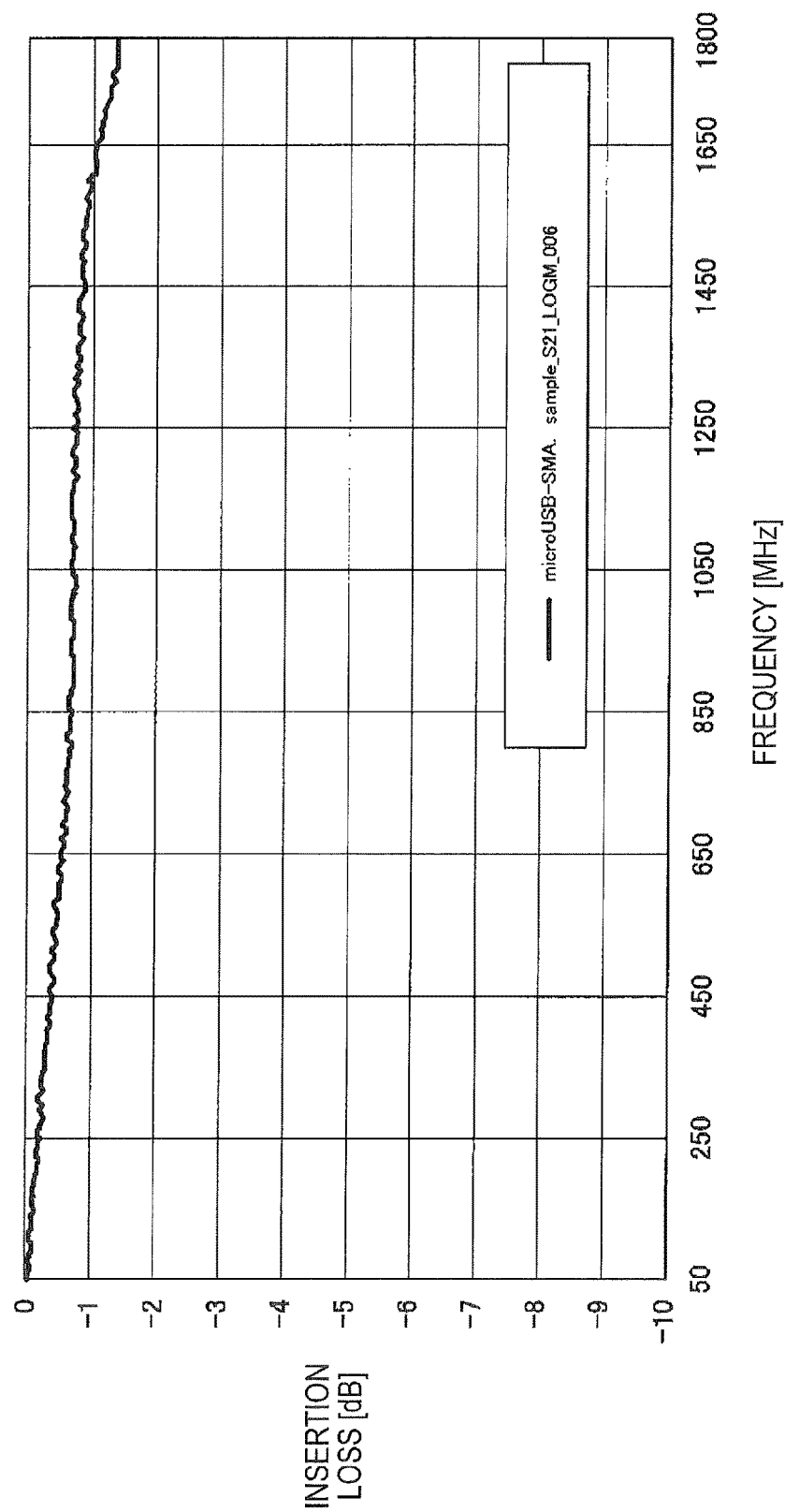
FIG. 11 is a diagram showing frequency characteristics of the sample (one) of the USB-SMA conversion cable when the substrate structure shown in FIGS. 10(A) to 10(C) is adopted.

FIG. 11 shows a result of measurement of one sample of the USB-SMA conversion cable produced by adopting the substrate structure shown in FIGS. 10(A) to 10(C) for the μUSB plug substrate. In this experiment, pass characteristics are examined by connecting a semi-rigid cable to the ID terminal (4-pin) between μUSB connectors and taking transmission characteristics in the GHz band into consideration. FIG. 11 is a result of the above experiment. The semi-rigid cable means a cable that cannot be freely bent to transmit a high-frequency wave, that is, a "slightly rigid" cable and is generally used by those involved in high-frequency waves.

Comparison of FIGS. 3 and 11 shows that while valid characteristics are obtained only up to 950 MHz in FIG. 3, as a result of adopting the above substrate structure, that frequency characteristics can be extended up to 1.8 GHz is verified in FIG. 11. That is, as shown in FIG. 11, the maximum transmission loss is 1.5 dB or less at 1.8 GHz, which shows that the USB-SMA conversion cable can be used without causing any problem at 1.8 GHz or less.

In the foregoing, the USB input/output apparatus has been described as an embodiment of the present disclosure. However, the present disclosure is not limited to the USB input/output apparatus and can also be applied to an input/output apparatus using, for example, an MILL (Mobile High-definition Link) other than USB.

Here, characteristics of the ID terminal of the above USB connector will be discussed. The USB connector is modified and expanded while upgrading quickly. Thus, as an actual problem, the actual standard is not defined in most cases. In the standard of USB-On-The-Go (USB-OTG) using the ID terminal, the ID terminal of a host (side) device is basically connected to GND via a resistance of 10Ω or less and the ID terminal of a device on the peripheral side (peripheral device) is OPEN or connected to GND via a resistance of 100 KΩ or more. In the actual operation, each company has specifications specific to the company for operation such as using each device depending of the value of resistance.

When connection target devices are connected alone, the connection is one-to-one (1.1), but a plurality of devices may be made connectable via a host device or a USB hub so that devices are connected by switching the host device or the USB hub. In this case, connections of multi-to-one, one-to-multi, and multi-to-multi become possible and switching thereof is controlled by the host device or the like.

These connection intended devices include, in addition to so-called host devices (information processing devices) such as PCs and so-called peripheral devices (information terminal devices) such as various mobile devices, USB chargers or the like to supply power. Connection target devices also include various devices connected to other interface standards via a host device or a hub for expansion device connection.

In any case, the ID terminal of a USB connector shows a stable potential (fixed voltage) allowing to discriminate the connection target device at that time excluding the time of change (change point, change timing) due to switching of the connection target device. It is only necessary to obtain the resolution for discrimination due to a potential change (displacement) and thus, the ID terminal is a terminal whose operation (here, the information discrimination) is resistant even if the potential slightly changes. The potential of the ID terminal changes only when the connection target device is switched, which leads to less change points or change frequency.

The ID terminal is also a terminal to switch the internal operation of an information terminal device including an input/output apparatus (or an input/output connector) having the ID terminal by knowing the type of the connection target device. Therefore, the ID terminal can be said to be a terminal to which an information signal called a so-called operation mode switching signal is supplied.

FIG. 12 is a diagram showing the functions of the μUSB terminal and the MHL terminal in comparison. As shown in FIG. 12, MHL is a standard assuming a combined use of a USB connector and can use the USB connector directly and has a control signal (CBUS) terminal in a pin corresponding to the ID terminal of the USB connector.

In MHL, the CBUS terminal is used as a control signal of a solid wire. That is, CBUS is used to set and control the output apparatus side (source) and the receiving apparatus side (sink) in a user usage environment of various audio/visual devices. For example, CBUS is replaced by the DDC (Display Data Channel) function in general DVI (Digital Visual Interface) connection. CBUS is also used as an MHL sideband channel (MSC) realizing the control function between the source and sink.

Thus, the CBUS terminal is a terminal for an information signal that can be called an operation mode switching signal. That is, in the interface standard of the MHL standard, only by changing an internal operation of an information terminal apparatus including an input/output apparatus (or an input/output connector) using the same terminal for USB connector, the information terminal apparatus can be made to support the MHL standard.

An input/output, apparatus according to the present disclosure naturally includes, in addition to the embodiment (the USB input/output apparatus and MHL input/output apparatus) disclosed herein, various application examples and modifications without deviating from the spirit and scope of the present disclosure described in claims.

Additionally, the present technology may also be configured as below.

(1) An input/output apparatus,
wherein among information terminals of an input/output connector provided in an information terminal device, at least one information terminal of information terminals to switch an internal operation of the information terminal device is used also as an antenna input terminal.

(2) The input/output apparatus according to (1),
wherein when at least the one information terminal is used further as another information terminal, the other information terminal is an information terminal of a frequency lower than a frequency of a received signal input from the antenna input terminal.

(3) The input/output apparatus according to (1),
wherein at least the one information terminal is an information terminal in which content of information thereof is discriminated based on a potential of an input information signal.

(4) The input/output apparatus according to any one of (1) to (3),
wherein at least the one information terminal is the information terminal used to discriminate a connection target device, to discriminate whether the connection target device is connected, or to select information during operation switching.

(5) The input/output apparatus according to any one of (1) to (4),
wherein at least the one information terminal is an ID terminal used to discriminate a connection target device.

(6) The input/output apparatus according to any one of (1) to (5),
wherein an antenna signal input into the antenna input terminal is a broadcast wave signal of one of an FM band, a VHF hand, and a UHF band or a plurality of these bands.

(7) The input/output apparatus according to (6),
wherein a capacitor allowing a frequency in the bands to pass is connected to a line to which at least the one information terminal is connected.

(8) The input/output apparatus according to (7),
wherein a high-frequency cutoff element having a high impedance for the frequency in the bands is connected, in parallel with the capacitor, to the line to which at least the one information terminal is connected.

(9) The input/output apparatus according to any one of (6) to (8),
wherein a terminal to which a line transmitting a differential signal is connected is provided in the input/output connector and a common mode choke element having a high impedance for a frequency in the bands is connected to a terminal into which the differential signal is input.

(10) The input/output apparatus according to any one of (1) to (9),
wherein a ground line of the input/output connector is connected to a shielding case of the information terminal device.

(11) The input/output apparatus according to any one of (1) to (10),
wherein a first connection portion to connect a coaxial cable functioning as an antenna that receives a broadband wave signal of one of an FM band, a VHF band, and a UHF band or a plurality of these bands is provided in the input/output connector.

(12) The input/output apparatus according to (1),
wherein the antenna to receive the broadcast wave signal or a coaxial connector is connected to the other end of the coaxial cable.

(13) The input/output apparatus according to (11) or (12),
wherein a second connection portion to connect an input/output cable is further provided in the input/output connector.

(14) The input/output apparatus according to (13),
wherein the first connection portion and the second connection portion are separated on a substrate to which the input/output connector is fixed.

(15) The input/output apparatus according to (13) or (14),
wherein the first connection portion and the second connection portion are connected so as to share a plurality of terminals of the input/output connector.

(16) The input/output apparatus according to (1) to (15),
wherein an antenna signal input into at least the one information terminal is further extended to a frequency band used by GPS or a mobile phone.

(17) The input/output apparatus according to (16),
wherein the frequency band used by GPS or a mobile phone is a GHz band and, to allow a signal in the GHz band to pass, a substrate of the input/output connector includes two substrates arranged in parallel with each other in which ground terminals are connected and also terminals to which each pin of the input/output connector provided on an upper substrate and a lower substrate arranged in parallel are arranged so as not to overlap when viewed from a top face.

(18) The input/output apparatus according to any one of (1) to (17),
wherein the information terminal device is a mobile information terminal device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 17, 51, 61 coaxial shielding wire (coaxial cable)
10 set-side USB connector
15, 53, 62 coaxial line-side USB connector
11, 13, 27, 30, 32, 64, 65, 66, 67 ferrite bead (FB)
12, 28, 31 common mode choke
14, 71$a$ to 71$d$ capacitor
16, 70 resistor
18 SMA connector
20 metal shield
40 eye pattern
41, 42 differential signal 43 template
55, 56 earphone cord
54 earphone jack
57, 58, 68, 69 earphone
63 microphone
71 power line connection terminal (1-pin)
72 D+ line connection terminal (2-pin)
73 D− line connection terminal (3-pin)
74 ID connection terminal (4-pin)
75 earth terminal (5-pin)
76 shielding terminal
77 through hole
81, 82 earth face
83 dielectric

The invention claimed is:

1. An input/output apparatus, comprising:
an input/output connector including
a plurality of information terminals including a first, second, third and fourth information terminals;
a first substrate including a first ground terminal; and
a second substrate including a second ground terminal,
wherein at least one of the information terminals is configured to switch an internal operation of an information terminal device,
wherein the at least one of the information terminals is simultaneously used as an antenna input terminal to receive antenna signal while switching the internal operation of the information terminal device,
wherein the information terminals connected to each pin of the input/output connector are not overlapped in a top view,
wherein the first information terminal is connected with a first ferrite bead, wherein the second and third information terminals are connected with a common mode choke, wherein the fourth information terminal is connected with a second ferrite bead and a capacitor, and wherein the second ferrite bead is connected in parallel with the capacitor.

2. The input/output apparatus according to claim 1, wherein the first substrate and the second substrate are provided in parallel, and the first ground terminal and the second ground terminal are connected, and wherein the first substrate and the second substrate are connected by a through hole and are maintained at a conduction potential.

3. The input/output apparatus according to claim 1, wherein at least one of a plurality of other information terminals receives a frequency lower than a frequency of a received signal input from the antenna input terminal.

4. The input/output apparatus according to claim 1, wherein the at least one of the information terminals includes an identification terminal configured to discriminate a connection target device, and wherein the identification terminal is also configured to receive antenna signal.

5. The input/output apparatus according to claim 4, wherein the identification terminal is configured to discriminate content of information based on a potential of an input information signal.

6. The input/output apparatus according to claim 4, wherein the antenna signal input into the identification terminal is a broadcast wave signal of one of an FM band, a VHF band, and a UHF band or a combination thereof.

7. The input/output apparatus according to claim 6, wherein the capacitor allowing a frequency, associated with the broadcast wave signal, to pass is connected to a line to which the identification terminal is connected.

8. The input/output apparatus according to claim 7, wherein the second ferrite bead connects the identification terminal.

9. The input/output apparatus according to claim 1, wherein a ground line of the input/output connector is connected to a shielding case of the information terminal device.

10. The input/output apparatus according to claim 1, wherein the input/output connector includes a first connection portion connecting a coaxial cable functioning as an antenna that receives a broadband wave signal of one of an FM band, a VHF band, and a UHF band or a combination thereof.

11. The input/output apparatus according to claim 10, wherein the antenna to receive the broadcast wave signal or the coaxial connector is connected to an end of the coaxial cable different from where the input/output connector is connected.

12. The input/output apparatus according to claim 10, wherein a second connection portion to connect an input/output cable is further provided in the input/output connector.

13. The input/output apparatus according to claim 12, wherein the first connection portion and the second connection portion are separated on a substrate to which the input/output connector is fixed.

14. The input/output apparatus according to claim 12, wherein the first connection portion and the second connection portion are connected so as to share the plurality of information terminals of the input/output connector.

15. The input/output apparatus according to claim 1, wherein the at least one of the information terminals is configured to discriminate whether the connection target device is connected, or to select information during operation switching.

16. The input/output apparatus according to claim 1, wherein an antenna signal input into the antenna input terminal is further extended to a frequency band used by GPS or a mobile phone, and wherein the frequency band is a GHz band.

17. The input/output apparatus according to claim 1, wherein the information terminal device is a mobile information terminal device.

18. The input/output apparatus according to claim 1, wherein a dielectric is provided between the first substrate and the second substrate.

* * * * *